United States Patent
Lam et al.

(10) Patent No.: US 9,211,957 B2
(45) Date of Patent: Dec. 15, 2015

(54) AIRCRAFT FUEL TANK VENTILATION

(75) Inventors: Joseph K-W Lam, Bristol (GB);
Franklin Tichborne, Bristol (GB);
Simon Masters, Bristol (GB); David Parmenter, Uckfield (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 672 days.

(21) Appl. No.: 13/381,699

(22) PCT Filed: Jul. 12, 2010

(86) PCT No.: PCT/GB2010/051136
§ 371 (c)(1),
(2), (4) Date: Dec. 30, 2011

(87) PCT Pub. No.: WO2011/010124
PCT Pub. Date: Jan. 27, 2011

(65) Prior Publication Data
US 2012/0096879 A1   Apr. 26, 2012

(30) Foreign Application Priority Data

Jul. 22, 2009   (GB) .................................. 0912710.1
Sep. 11, 2009   (GB) .................................. 0915956.7

(51) Int. Cl.
*F25D 17/06*   (2006.01)
*B64D 37/32*   (2006.01)

(52) U.S. Cl.
CPC ......... *B64D 37/32* (2013.01); *Y10T 137/86324* (2015.04)

(58) Field of Classification Search
CPC .......................... F24F 3/1405; F24F 2003/144
USPC .............. 62/93, 113, 156, 279, 285; 137/587
See application file for complete search history.

(56) References Cited

U.S. PATENT DOCUMENTS

| | | | |
|---|---|---|---|
| 3,419,233 A | 12/1968 | Wotton | |
| 5,168,709 A | 12/1992 | Bombard | |
| 5,655,732 A | 8/1997 | Frank | |
| 6,432,169 B1 * | 8/2002 | Kluwe et al. | ...................... 95/52 |
| 2008/0229765 A1 * | 9/2008 | Kuenzel et al. | ................... 62/93 |

FOREIGN PATENT DOCUMENTS

| | | |
|---|---|---|
| DE | 4408493 C1 | 2/1995 |
| GB | 1067591 A | 5/1967 |

(Continued)

OTHER PUBLICATIONS

Search Report for GB 0915956.7 dated Jan. 12, 2010.
(Continued)

*Primary Examiner* — Melvin Jones
(74) *Attorney, Agent, or Firm* — Hauptman Ham, LLP

(57) ABSTRACT

An aircraft fuel tank ventilation system, comprising a refrigerative dehumidifying device having a refrigerating element in contact with air flowing between a vent open to the atmosphere and a fuel tank. Also, a method of dehumidifying air introduced into an aircraft fuel tank via the ventilation system, the method comprising directing atmospheric air from the vent into contact with the refrigerating element, and cooling the refrigerating element so as to remove water vapor from the air flowing from the vent towards the fuel tank by condensation.

18 Claims, 3 Drawing Sheets

(56) References Cited

FOREIGN PATENT DOCUMENTS

| GB | 1395691 A | 5/1975 |
|---|---|---|
| GB | 2379607 A | 3/2003 |

OTHER PUBLICATIONS

International Search Report for PCT/GB2010/051136 dated Oct. 22, 2010.

\* cited by examiner

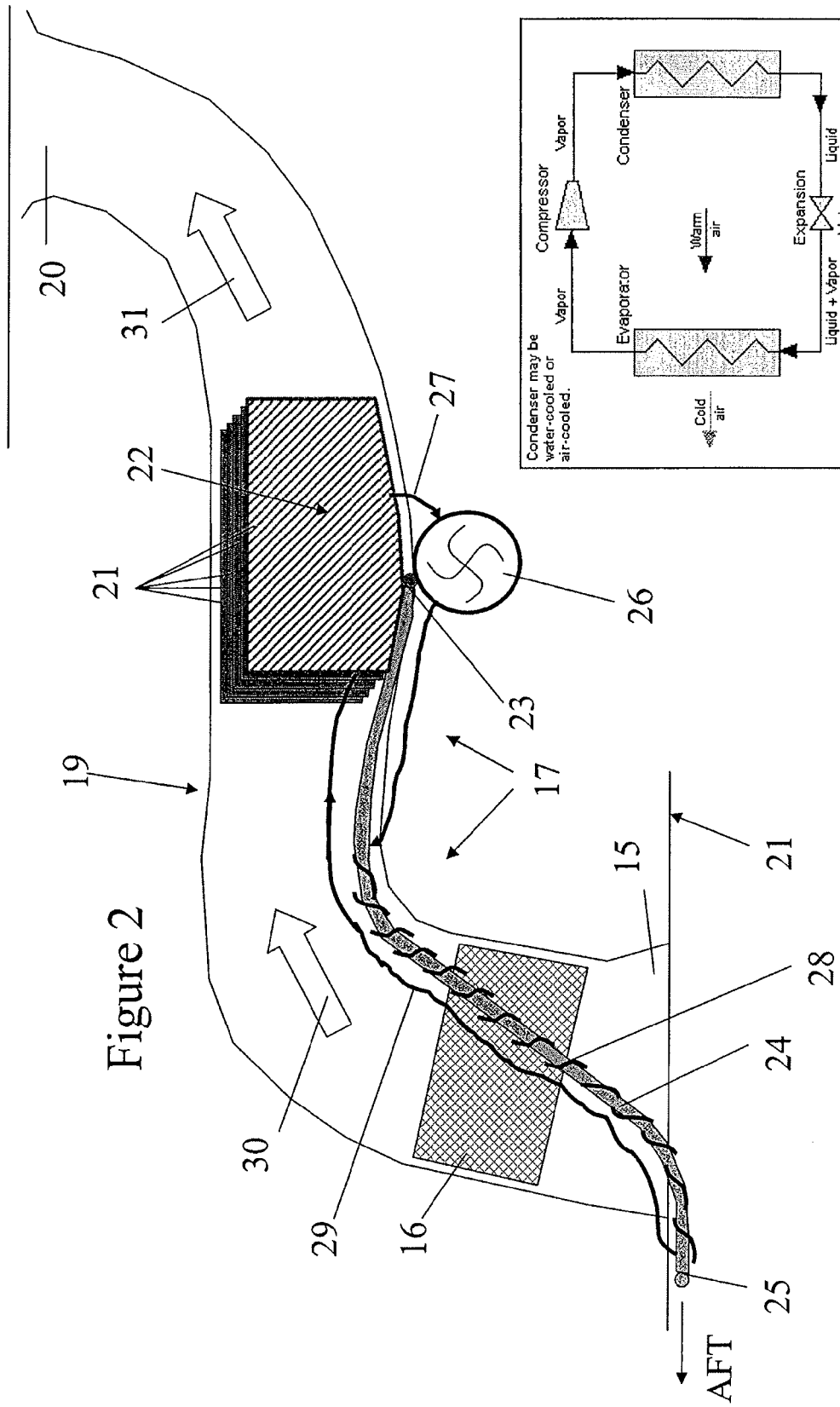

AIRCRAFT FUEL TANK VENTILATION

RELATED APPLICATIONS

The present applications is a National Phase of International Application Number PCT/GB 2010/051136,filed Jul. 12, 2010 and claims priority from British Application Number 0912710.1, filed Jul. 22, 2009, and from British Application Number 09159567.7, filed Sep. 11, 2009.

FIELD OF THE INVENTION

The present invention relates to an aircraft fuel tank ventilation system having a refrigerative dehumidifying device. The present invention also relates to a method of dehumidifying air introduced into an aircraft fuel tank via the ventilation system using the refrigerative dehumidifying device.

BACKGROUND OF THE INVENTION

Water is an unavoidable contaminant in fuel. It can affect fuel system component reliability and lead to operational delays and increased maintenance activities. In addition, the propensity for microbiological contamination is directly proportional to the presence of water and the temperature within fuel tanks. Sources of water in aircraft fuel tanks is from fuel loaded into the aircraft fuel tanks during refuel (dissolved water) and from air entering the aircraft fuel tanks via its ventilation system. It is estimated that up to 30-40% of water in the fuel of aircraft fuel tanks is currently entering via the ventilation system, depending on atmospheric conditions.

During refill while the aircraft is on the ground, fuel is loaded onto the aircraft at a high volume flow rate to reduce the turnaround time. The fuel displaces the air in the fuel tanks as the tanks fill up. The air is pushed out of the fuel tanks via the ventilation system.

During climb, due to decreasing ambient pressure as the aircraft ascends, air expands in the ullage. Although the engines are consuming fuel, the rate of fuel consumption is less than the rate of air expansion. This results in a net outflow of air through the ventilation system.

During cruise, the fuel level decreases steadily as the engines consume the fuel. A decrease in the fuel level causes an increase in the ullage volume, and excess air is drawn in from ambient via the ventilation system to equalise pressures. At cruise, the ambient air is relatively cold and dry.

During descent, due to increasing ambient pressure as the aircraft descends, air contracts in the ullage. This results in a net inflow of ambient air through the ventilation system. The ingress of ambient air during descent brings relatively warm, humid air into the fuel system, and hence a significant volume of water enters the fuel tanks via the ventilation system.

There is therefore a need in the art for a system and method for reducing the ingress of moisture into an aircraft fuel tank via its ventilation system.

SUMMARY OF THE INVENTION

A first aspect of the invention provides an aircraft fuel tank ventilation system, comprising a refrigerative dehumidifying device having a refrigerating element in contact with air flowing between a vent open to the atmosphere and a fuel tank.

A further aspect of the invention provides a method of dehumidifying air introduced into an aircraft fuel tank via a ventilation system, the ventilation system including a vent open to the atmosphere and a refrigerative dehumidifying device having a refrigerating element, the method comprising directing atmospheric air from the vent into contact with the refrigerating element, and cooling the refrigerating element so as to remove water vapour from the air flowing from the vent towards the fuel tank by condensation.

The invention is advantageous in that water can be effectively removed from air entering the aircraft fuel tank. In this way, the content of water in the fuel tank can be kept low, which improves fuel system component reliability, reduces maintenance activities, and reduces microbiological contamination.

The system and method of the invention are particularly effective at removing moisture from ingress humid air during descent. In a preferred embodiment of the invention, the refrigerating element is a condensing cold plate. The refrigerating element can be connected in a refrigerating cycle to a compressor. The refrigerating cycle may be a single stage vapour compression cycle, for example. Alternatively, the refrigerating element can be cooled electronically, such as by a Peltier effect device, for example.

The cold plate may have a plurality of ribs on its surface. As water condenses out of the air flow on the surface of the cold plate through nucleation and growth it beads in grooves between the ribs. The cold plate may be arranged substantially vertically with the ribs inclined with respect to the direction of the air flow. The combined effect of gravity and the air flow encourages the water beads to flow towards the bottom of the plate. To increase the efficiency of the refrigerative dehumidifying device, the cold plate may be one of an array of similar cold plates. These may be arranged side by side to allow the air flow to pass between adjacent plates.

Water from the refrigerative dehumidifying device may be collected in a sump. In a preferred embodiment, the sump is disposed beneath an array of vertically arranged cold plates. The location and shape of the sump can be tailored according to the refrigerating element(s) used. The sump will need to be drained and this may be done periodically, e.g. during maintenance activities, but is preferably done continuously whilst the device is operating. For example, a discharge tube may be used to pass condensate from the refrigerating element to the atmosphere. The discharge tube may be connected at one end to the sump. At its other end, motion of the aircraft may be used to generate suction within the discharge tube drawing the water out into the atmosphere. This is preferable as no active pumping is required, which reduces power consumption and parts. However, a pump may be used if desired.

A temperature sensor may be provided for monitoring the temperature of the refrigerating element. The rate of cooling the refrigerating element can be increased if the temperature is too high to optimally dehumidify the air. The latent heat of the water condensing on the refrigerating element should keep the element from freezing over. However, if the temperature drops below a predetermined threshold, then cooling of the refrigerating element can be stopped. Since aircraft can be subjected to extreme weather conditions, it may also be desirable to provide anti-icing measures for the dehumidifying device. For example, the discharge tube may be heated by an additional heating element, such as an electric heater. A suitable heating element may also be used for heating the refrigerating element.

Where the refrigerating element is cooled by a Peltier effect device, it may be able to perform a self-defrosting function.

In a preferred embodiment, the refrigerating element may be disposed within a NACA duct assembly of the ventilation system. Aircraft fuel tank ventilation systems typically include a NACA duct assembly. Many aircraft have wing fuel tanks and so it is common for the fuel tank ventilation system to include NACA ducts which vent to the atmosphere from the lower wing surface. Some, particularly large, aircraft include a vent tank at each wing tip, and the NACA duct can be disposed in the vent tank. The NACA duct assembly typically includes the NACA vent (or inlet), a flame arrestor (or vent protector) and an outlet, such as a "bellmouth" outlet. The flame arrestor prevents ignition sources from entering the fuel tanks via the ventilation system. In the preferred embodiment, the refrigerating element may be disposed within the NACA duct between the flame arrestor and the outlet. However, the refrigerating element may be disposed elsewhere within the NACA duct assembly, or within another part of the ventilation system between the vent and the fuel tank. Most preferably, all the key components of the dehumidifying device form part of the NACA duct assembly. In some circumstances, it may be possible to modify an existing NACA duct assembly to include the dehumidifying device as a retrofit part.

The method may be operated during the descent phase of an aircraft flight, where the aircraft is most likely to pass though warm humid air, and where there will be a net inflow of that air into the fuel tanks via the ventilation system. However, it may be operated during other flight phases, such as during cruise.

BRIEF DESCRIPTION OF THE DRAWINGS

Embodiments of the invention will now be described with reference to the accompanying drawings, in which:

FIG. 2 illustrates schematically a NACA duct assembly of the ventilation system having the dehumidifying device;

FIG. 3 illustrates schematically a typical single-stage vapour compression refrigeration cycle.

DETAILED DESCRIPTION OF EMBODIMENT(S)

Figure 1:
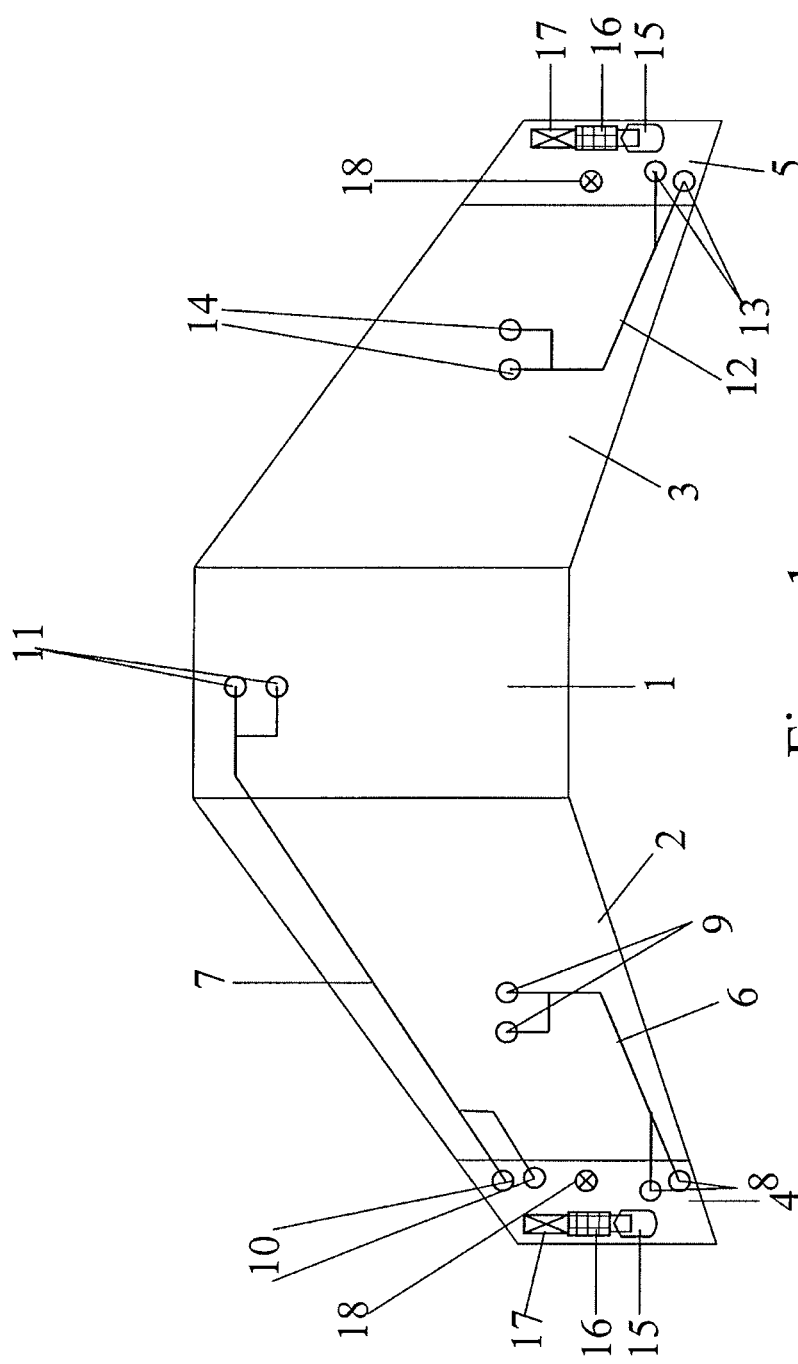
FIG. 1 illustrates schematically an aircraft wing having three fuel tanks and a ventilation system including a dehumidifying device.

FIG. 1 shows a general ventilation system architecture for a three-tank configuration of an aircraft fuel system. The fuel system includes a centre tank 1, a left wing tank 2 and a right wing tank 3. The ventilation system includes a left vent tank 4 and a right vent tank 5. The left vent tank 4 ventilates the centre tank 1 and the left wing tank 2 by means of ventilation pipes 6, 7 which open into ventilation inlets 8, 9, 10, 11. The right vent tank 5 ventilates the right wing tank 3 by means of ventilation pipe 12 which opens into ventilation inlets 13 and 14.

Each vent tank 4, 5 includes a NACA duct assembly including a NACA vent, or NACA scoop, 15 which opens to the atmosphere on the lower aerodynamic surface of the aircraft wing. The vent tanks 4, 5 further include a vent protector, or flame arrestor, 16 and a dehumidifying device 17. The dehumidifying device 17 is disposed in flow communication between the NACA vent 15 and the respective vent tank 4, 5. The vent tanks 4, 5 further include an over pressure protector 18.

One of the NACA duct assemblies including the dehumidifying device 17 is shown schematically in FIG. 2. The NACA duct assembly includes the vent (or inlet) 15, a duct 19, and a "bellmouth" outlet 20. The NACA vent 15 opens in the lower surface 21 of the aircraft wing. The bellmouth outlet 20 opens into the respective vent tank 4, 5. The flame arrestor 16 is disposed within the duct 19 and prevents ignition sources from entering the fuel tanks via the ventilation system.

The dehumidifying device 17 is of a condensing (or refrigerating) type and includes an array of condensing cold plates 21 disposed within the duct 19. In the direction of air flowing from the inlet 15 to the outlet 20, the flame arrestor 16 is disposed downstream of the inlet 15 and upstream of the cold plates 21. The cold plates 21 are generally vertically arranged and each has a plurality of ribs 22 formed on the surfaces of the plates 21. The ribs are inclined downwardly with respect to the direction of air flowing from the inlet 15 to the outlet 20. A sump 23 is provided at the bottom of the cold plates 21 for collecting condensate. The sump 23 is connected to one end of a discharge tube 24, which passes within the duct 19 from the sump 23 to the NACA inlet 15. The other end 25 of the discharge tube 24 opens to the atmosphere just downstream of the NACA inlet 15 with the discharge tube outflow generally aligned with the air flow under the aircraft wing during flight.

The condensing cold plates 21 form the evaporator section in a single-stage vapour compression refrigeration cycle, which also includes a compressor 26, and refrigerant conduits 27, 28, 29. The refrigeration cycle will be described in detail later.

During the descent phase of the aircraft flight, air flows into the fuel tanks 1, 2, 3 through the NACA duct assemblies having the refrigerative dehumidifying devices 17. The condensing element (cold plates 21), aligned with the airflow, interacts with the ingress humid air. Warm humid air 30 passes through the matrix of cold plates 21 with water condensing out and leaving cool dry air 31 exhausting from the matrix. When the warm humid air 30 comes into contact with the cold plates 21, water condenses out from the humid air onto the cold plates through nucleation and growth. The condensed water then runs down the ribs 22 on the cold plates 21 under gravity and shear of flowing air. It is collected in the sump 23 at the bottom of the cold plate matrix.

The discharge tube 24 drains the water from the sump 23 by an airflow suction effect. The ambient air flowing over the discharge tube outlet 25 due to the forward motion of the aircraft creates a low pressure at the outlet 25. With the head of water in the sump 23 and a low pressure at the tube outlet 25, water is forced through the discharge tube 24 flowing from the sump 23 to the outlet 25.

FIG. 3 illustrates schematically a typical vapour compression cycle. Essentially, the cycle moves heat from one location (the 'source', 'heat source' or 'evaporator') to another location (the 'sink', 'heat sink' or 'condenser') using mechanical work (by a compressor). It works by exploiting the physical properties of an evaporating and condensing fluid known as a refrigerant. The cold plates 21 serve as the heat source (evaporator) and the discharge tube 24 serves as the heat sink (condenser) in the refrigeration cycle.

Heat is transferred from the warm humid air 30 through the cold plates 21 to vaporized refrigerant in refrigerant conduit 27. The compressor 26 delivers the vaporized refrigerant from the heat source (cold plates 21) under high pressure and temperature to the heat sink (discharge tube 24). The cool water in the discharge tube 24 absorbs the heat through the walls of the discharge tube 24 from the vaporized refrigerant passing in refrigerant conduit 28, which is helically wound around the tube 24. The cool water condenses the refrigerant in conduit 28 and itself becomes heated in the process. The liquid refrigerant then enters a throttle valve (not shown in FIG. 2) and, expanding, comes out as a liquid-vapour mixture at a lower temperature and pressure, which passes along refrigerant conduit 29 towards the cold plates 21. It then enters the evaporator (cold plates 21), where the liquid is evaporated by contact with a comparatively warmer space. The vapour then passes along conduit 27 to the compressor 26, and the cycle is repeated.

A positive bonus of using the discharge tube 24 as the condenser in the refrigeration cycle is that it keeps the water from freezing up in the tube 24 and thereby allowing uninterrupted flow of water even at low temperatures.

Provision is made to regulate the cold plate 21 temperature to avoid ice building up on the cold plate surfaces through a simple control. The control may be simply a feedback control. For example, a temperature sensor (not shown) on the cold plate 21 can feed a signal to the compressor 26 controller. The compressor is switched on during the descent phase of the flight and when the cold plate 21 temperature is above 0 degrees Celsius. The compressor 26 may be switched off at all other phases of the flight. The rate of cooling the cold plate 21 can be increased if the temperature is too high to optimally dehumidify the air. The latent heat of the water condensing on the cold plate should keep it from freezing over. However, if the temperature drops below a predetermined threshold, then cooling of the cold plate 21 can be stopped.

Since aircraft can be subjected to extreme weather conditions, it may also be desirable to provide anti-icing measures for the dehumidifying device 17. For example, the discharge tube 24 may be heated by an additional heating element, such as an electric heater. A suitable heating element may also be used for heating the cold plate 21. For simplicity, the same heating element may be used for heating the cold plate 21 and the discharge tube 24.

Since the refrigerative dehumidifying device 17 can be incorporated into a NACA duct assembly, the NACA duct assembly having the dehumidifying device can be used as a direct replacement for existing NACA duct assemblies on existing aircraft designs.

Figure 4:
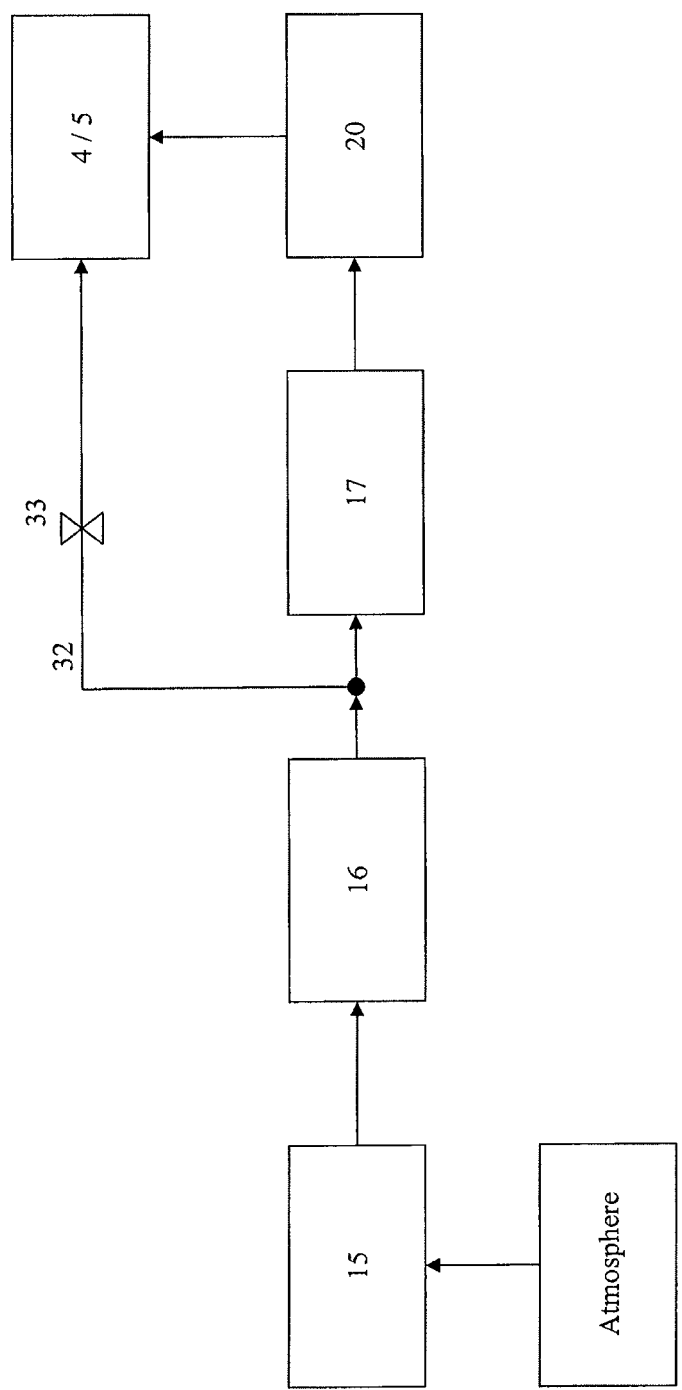
FIG. 4 illustrates a block diagram of an alternative ventilation system in which the dehumidifying device has a bypass.

FIG. 4 shows a block diagram of a second embodiment of the ventilation system in which the dehumidifying device 17 has a bypass. A bypass conduit 32 having a valve 33 is connected between the vent protector 16 and its respective vent tank 4, 5. In all other respects, the second embodiment is identical to the first. The valve 33 is selectively openable to control flow of air through the bypass 32. In an extreme event, when the dehumidifying device 17 is blocked (e.g. due to icing or otherwise), the bypass valve 33 is opened to allow free passage of air to flow between the atmosphere and the vent tank 4, 5. The direction of the air flow through the bypass 32 would be dependent on the pressure differential between atmospheric and that of the vent tanks 4, 5. A pressure sensor (not shown) is connected to a controller (also not shown) for controlling the operation of the valve 33 in the bypass 32 of each of the dehumidifying devices 17. The pressure sensors may be located within the vent tanks 4, 5, for example.

Although the invention has been described in relation to a three-tank fuel system, the invention is applicable to a fuel system having any number of tanks, including one.

As an alternative to discharging the condensate from the dehumidifying device continuously, it is also possible to drain the condensate from the sump periodically during ground maintenance activities, or else mix it with fuel and feed it to the aircraft engines to be burnt off during flight.

Although the invention has been described above with reference to one or more preferred embodiments, it will be appreciated that various changes or modifications may be made without departing from the scope of the invention as defined in the appended claims.

The invention claimed is:

1. An aircraft fuel tank ventilation system, comprising a refrigerative dehumidifying device having a refrigerating element in contact with air flowing between a vent open to ambient atmosphere and a fuel tank, the refrigerating element is coupled in a refrigeration cycle, the refrigeration cycle for cooling the refrigerating element.

2. An aircraft fuel tank ventilation system, comprising a refrigerative dehumidifying device having a refrigerating element in contact with air flowing between a vent open to ambient atmosphere and a fuel tank, wherein the refrigerating element is a condensing cold plate.

3. A ventilation system according to claim 1, wherein the refrigerating element is connected in the refrigeration cycle to a compressor.

4. A ventilation system according to claim 1, wherein the refrigeration cycle is a single stage vapour compression cycle.

5. A ventilation system according to claim 2, wherein the cold plate has a plurality of ribs on its surface, the ribs being inclined with respect to the direction of the air flow.

6. A ventilation system according to claim 2, wherein the cold plate is one of an array of similar cold plates.

7. A ventilation system according to claim 1, further comprising a discharge tube adapted to pass condensate from the refrigerating element to the atmosphere.

8. A ventilation system according to claim 7, wherein the discharge tube is heated by latent heat removed from the refrigerating element.

9. A ventilation system according to claim 1, further comprising a temperature sensor for monitoring the temperature of the refrigerating element.

10. A ventilation system according to claim 1, further comprising a heating element for heating the refrigerating element.

11. A method of dehumidifying air introduced into an aircraft fuel tank via a ventilation system, the ventilation system including a vent open to ambient atmosphere and a refrigerative dehumidifying device having a refrigerating element, the method comprising directing atmospheric air from the vent into contact with the refrigerating element, and cooling the refrigerating element so as to remove water vapour from the air flowing from the vent towards the fuel tank by condensation.

12. A method according to claim 11, wherein the method is operated during a descent phase of an aircraft flight.

13. A method according to claim 11, wherein the refrigerating element is cooled by operating a vapour compression refrigeration cycle.

14. A method according to claim 11, further comprising discharging condensate from the refrigerating element to the atmosphere.

15. A method according to claim 14, wherein the discharging is driven by suction due to movement of the aircraft.

16. A method according to claim 11, further comprising feedback control of the refrigerating element temperature.

17. A ventilation system according to claim 7, wherein the discharge tube is heated by a heating element.

18. A ventilation system according to claim 7, wherein the discharge tube is heated by latent heat removed from the refrigerating element and by a heating element.

* * * * *